US012395795B2

(12) United States Patent
Ren et al.

(10) Patent No.: US 12,395,795 B2
(45) Date of Patent: Aug. 19, 2025

(54) SOUND DEVICE

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/915,114

(22) PCT Filed: Jul. 20, 2022

(86) PCT No.: PCT/CN2022/106635
§ 371 (c)(1),
(2) Date: Sep. 28, 2022

(87) PCT Pub. No.: WO2024/000677
PCT Pub. Date: Jan. 4, 2024

(65) Prior Publication Data
US 2025/0126413 A1 Apr. 17, 2025

(30) Foreign Application Priority Data
Jun. 30, 2022 (CN) ......................... 202221689808.1

(51) Int. Cl.
*H04R 9/06* (2006.01)
*H04R 7/04* (2006.01)
(Continued)

(52) U.S. Cl.
CPC ................. *H04R 9/06* (2013.01); *H04R 7/04* (2013.01); *H04R 7/18* (2013.01); *H04R 9/025* (2013.01);
(Continued)

(58) Field of Classification Search
CPC .......... H04R 9/025; H04R 9/046; H04R 9/06; H04R 7/127
See application file for complete search history.

(56) References Cited

U.S. PATENT DOCUMENTS

2023/0031282 A1* 2/2023 Ren .......................... H04R 9/06

FOREIGN PATENT DOCUMENTS

CN 208638659 U * 3/2019
CN 213906928 U 8/2021
CN 216134591 U 3/2022

* cited by examiner

*Primary Examiner* — Sunita Joshi
(74) *Attorney, Agent, or Firm* — Wiersch Law Group

(57) ABSTRACT

A sound device includes a frame, a vibration system, and a magnetic circuit system. The vibration system is supported on the frame. The magnetic circuit system has magnetic gaps. The vibration system includes a vibrating diaphragm, a voice coil, and a framework. The voice coil is inserted into the magnetic gaps to drive the vibrating diaphragm to vibrate and produce sound. The framework is configured to connect the vibrating diaphragm and the voice coil. The vibrating diaphragm includes an annular dome portion, an annular first folding ring portion, and an annular second folding ring portion. The dome portion is connected to the first folding ring portion and the second folding ring portion. The framework includes a framework flat plate wall and framework glue containing portions. Compared with related art, the sound device is wider in frequency band and better in high-frequency performance.

9 Claims, 5 Drawing Sheets

(51) Int. Cl.
*H04R 7/18* (2006.01)
*H04R 9/02* (2006.01)
*H04R 9/04* (2006.01)

(52) U.S. Cl.
CPC .......... *H04R 9/045* (2013.01); *H04R 2400/11* (2013.01)

SOUND DEVICE

TECHNICAL FIELD

The present disclosure relates to a field of electroacoustic conversion, and in particular to a sound device for electronic sound box products.

BACKGROUND

Sound devices are further known as speakers or loudspeakers and are applied to sound boxes for converting audio signals into sound for playing.

In the related art, the sound devices include a frame, a vibration system, and a magnetic circuit system. The vibration system is fixed on the frame, and the magnetic circuit system has magnetic gaps. The magnetic circuit system drives the vibration system to vibrate and produce sound. The vibration system includes a vibrating diaphragm, a dome, a voice coil, and a framework. The vibrating diaphragm is fixed on the frame, the dome is attached to the vibrating diaphragm, the voice coil is inserted into the magnetic gaps, and the framework is connected to the dome and the voice coil.

However, in the sound device of the related technologies, the dome and the framework are generally of a planar structure, resulting in insufficient strength of the dome and the framework, so that frequency band of the sound device is narrow and sound production effect is poor.

Therefore, it is necessary to provide a new sound device to solve above technical problems.

SUMMARY

The present disclosure aims to provide a sound device having a wider frequency band and better high-frequency performance.

In order to achieve above aims, the present disclosure provides the sound device, including a frame, a vibration system, and a magnetic circuit system. The vibration system is supported on the frame. The magnetic circuit system has magnetic gaps. The vibration system includes a vibrating diaphragm, a voice coil, and a framework. The voice coil is inserted into the magnetic gaps to drive the vibrating diaphragm to vibrate and produce sound. The framework is configured to connect the vibrating diaphragm and the voice coil. The vibrating diaphragm includes a dome portion, a first folding ring portion, and a second folding ring portion. The dome portion, the first folding ring portion, and the second folding ring portion are all annular. The first folding ring portion surrounds the second folding ring portion. The first folding ring portion and the second folding ring portion are mutually spaced. The dome portion is disposed between the first folding ring portion and the second folding ring portion. The dome portion is connected to the first folding ring portion and the second folding ring portion. The framework includes a framework flat plate wall and framework glue containing portions. The framework glue containing portions are bent from the framework flat plate wall to the magnetic circuit system. The framework flat plate wall is connected to the dome portion. The framework glue containing portions and the dome portion are disposed at intervals.

Furthermore, the dome portion includes a dome body, where the dome body is annular. The framework glue containing portions are in a flat plate shape. The framework glue containing portions are parallel to the dome body.

Furthermore, there are two framework glue containing portions. The two framework glue containing portions are symmetrically disposed on two sides of long shafts of the framework flat plate wall.

Furthermore, the vibrating diaphragm further includes a first fixing portion and a second fixing portion. The first fixing portion is bent and extends from one side, close to the second folding ring portion, of the first folding ring portion. The second fixing portion is bent and extends from one side, close to the first folding ring portion, of the second folding ring portion. The dome portion further includes a first dome extension wall and a second dome extension wall. The first dome extension wall and the second dome extension wall are bent and extend from the dome body to a direction close to the magnetic circuit system. The first dome extension wall is connected to the first fixing portion. The second dome extension wall is connected to the second fixing portion.

Furthermore, the framework further includes a first framework extension wall and a second framework extension wall. The framework flat plate wall is attached to one side, close to the voice coil, of the dome body. The first framework extension wall is formed by bending and extending from one side, close to the first folding ring portion, of the framework flat plate wall towards the magnetic circuit system. The first framework extension wall and the first dome extension wall are oppositely disposed at intervals. The second framework extension wall extends from one side, close to the second folding ring portion, of the framework flat plate wall towards the voice coil. The second framework extension wall is fixedly connected to the voice coil.

Furthermore, the first framework extension wall and the first fixing portion are disposed at intervals.

Furthermore, the first dome extension wall is formed by extending the dome body in a vibration direction of the vibrating diaphragm. The first framework extension wall is formed by extending one side, close to the first folding ring portion, of the framework flat plate wall in the vibration direction.

Furthermore, the first folding ring portion and the second folding ring portion are both of an arc-shaped structure. Arc-shaped concave directions of the first folding ring portion and the second folding ring portion are opposite.

Furthermore, the arc-shaped concave direction of the first folding ring portion is in a direction close to the voice coil. The arc-shaped concave direction of the second folding ring portion is in a direction distal from the voice coil.

Furthermore, the vibrating diaphragm further includes a third fixing portion. The third fixing portion is bent and extends from one side, distal from the second folding ring portion, of the first folding ring portion. The third fixing portion is fixed on an inner peripheral side of the frame.

Compared with related art, the sound device of the present disclosure includes the frame, the vibration system, and the magnetic circuit system. The vibration system is supported on the frame. The magnetic circuit system has the magnetic gaps. The vibration system includes the vibrating diaphragm, the voice coil, and the framework. The voice coil is inserted into the magnetic gaps to drive the vibrating diaphragm to vibrate and produce sound. The framework is configured to connect the vibrating diaphragm and the voice coil. The vibrating diaphragm includes the dome portion, the first folding ring portion, and the second folding ring portion. The dome portion, the first folding ring portion, and the second folding ring portion are all annular. The first folding ring portion surrounds the second folding ring portion. The first folding ring portion and the second folding ring portion are mutually spaced. The dome portion is disposed between the first folding ring portion and the second folding ring portion. The dome portion is connected to the first folding ring portion and the second folding ring portion. The framework includes the framework flat plate wall and framework glue containing portions. The framework glue containing portions are bent from the framework flat plate wall to the magnetic circuit system. The framework flat plate wall is connected to the dome portion. The framework glue containing portions and the dome portion are disposed at intervals. Therefore, by bending the framework from the framework flat plate wall to the magnetic circuit system, where the framework includes the framework glue containing portions, it is conducive to enhancing strength of the vibration system, which improves impact of division vibration on performance, expands high frequency of the sound device, and improves high-frequency performance of the sound device to a certain extent.

BRIEF DESCRIPTION OF DRAWINGS

In order to more clearly illustrate technical solutions in embodiments of the present disclosure, drawings required in description of the embodiments are briefly described below. Obviously, the drawings in the following description are merely some embodiments of the present disclosure. For a person of ordinary skill in art, other drawings may be obtained according to the drawings without creative efforts.

DETAILED DESCRIPTION OF EMBODIMENTS

Figure 1:
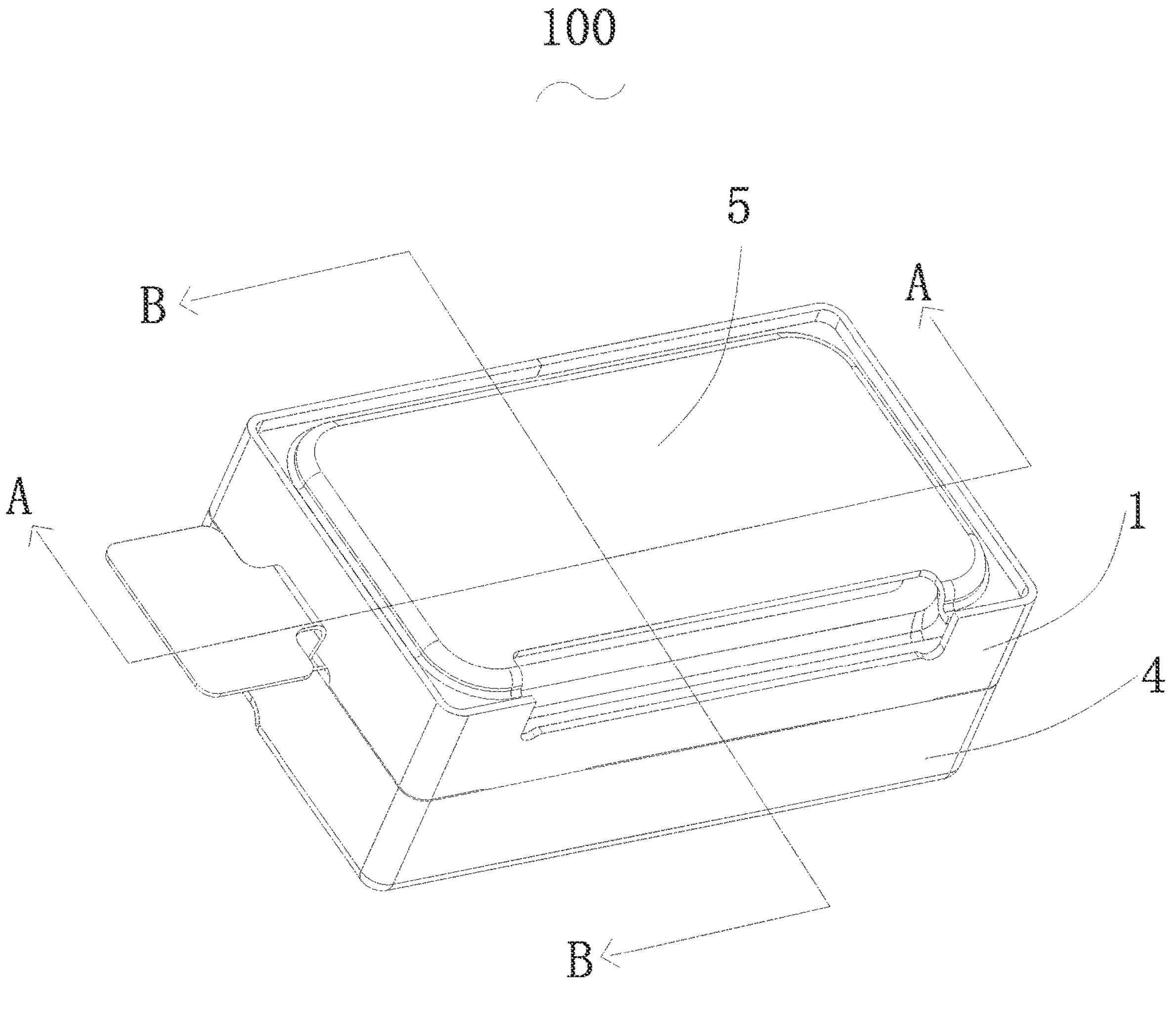
FIG. 1 is a three-dimensional structural schematic diagram of a sound device according to one embodiment of the present disclosure.
Figure 2:
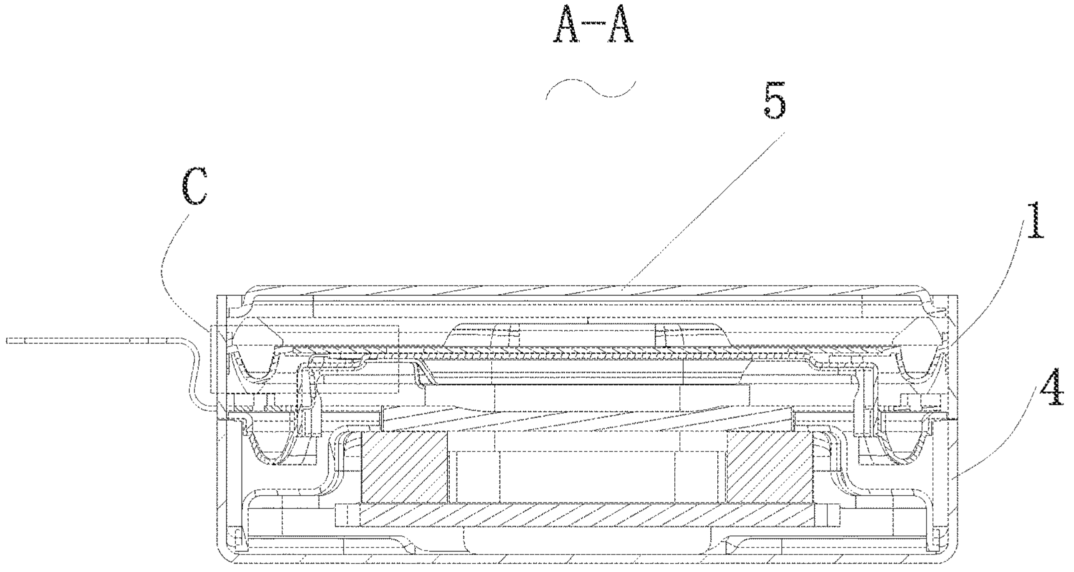
FIG. 2 is a cross-sectional schematic diagram taken along the line A-A shown in FIG. 1.
Figure 3:
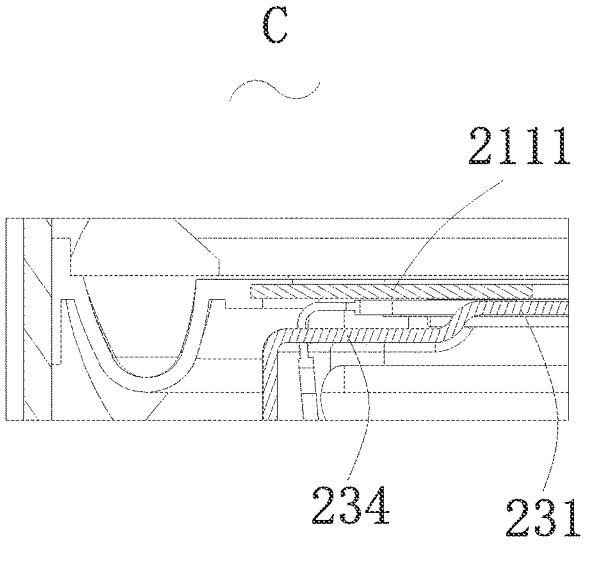
FIG. 3 is a schematic diagram of an enlarged view of portion C shown in FIG. 2.
Figure 4:
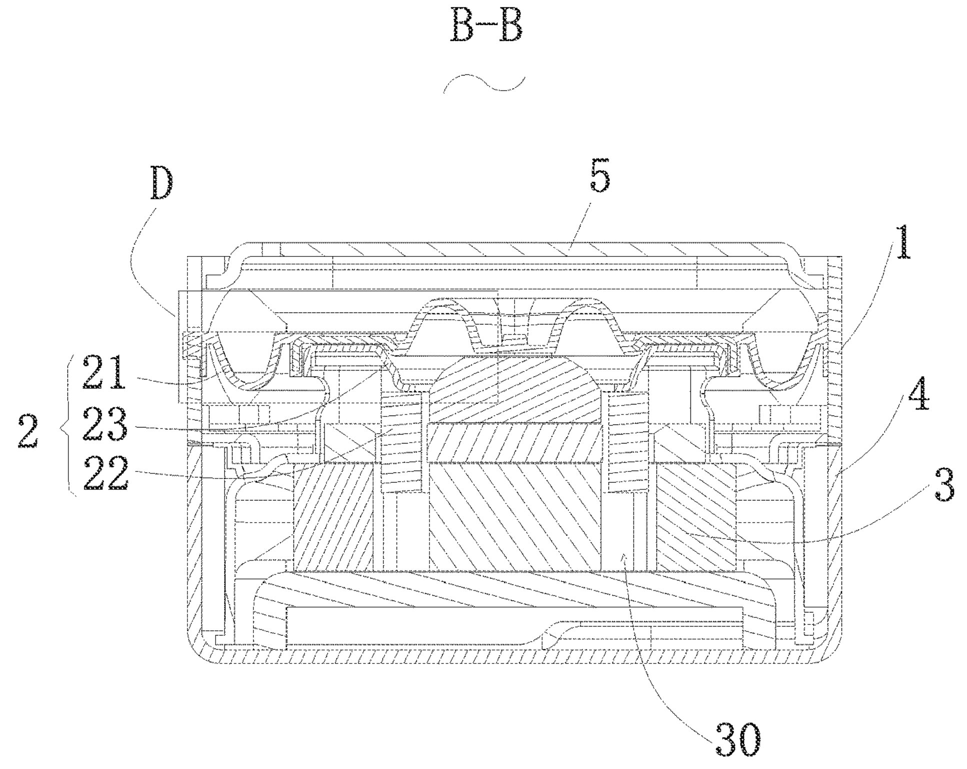
FIG. 4 is a cross-sectional schematic diagram taken along the line B-B shown in FIG. 1.
Figure 5:
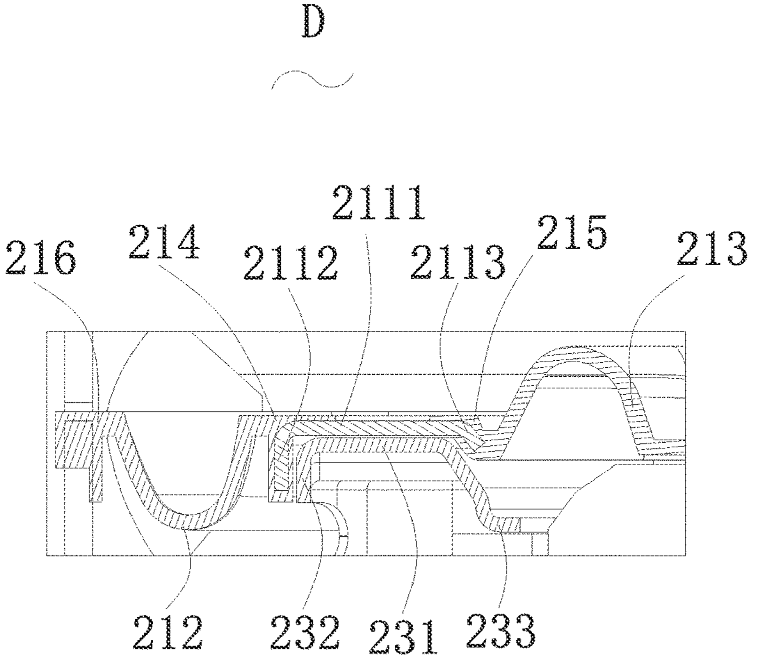
FIG. 5 is a schematic diagram of an enlarged view of portion D shown in FIG. 4.
Figure 6:
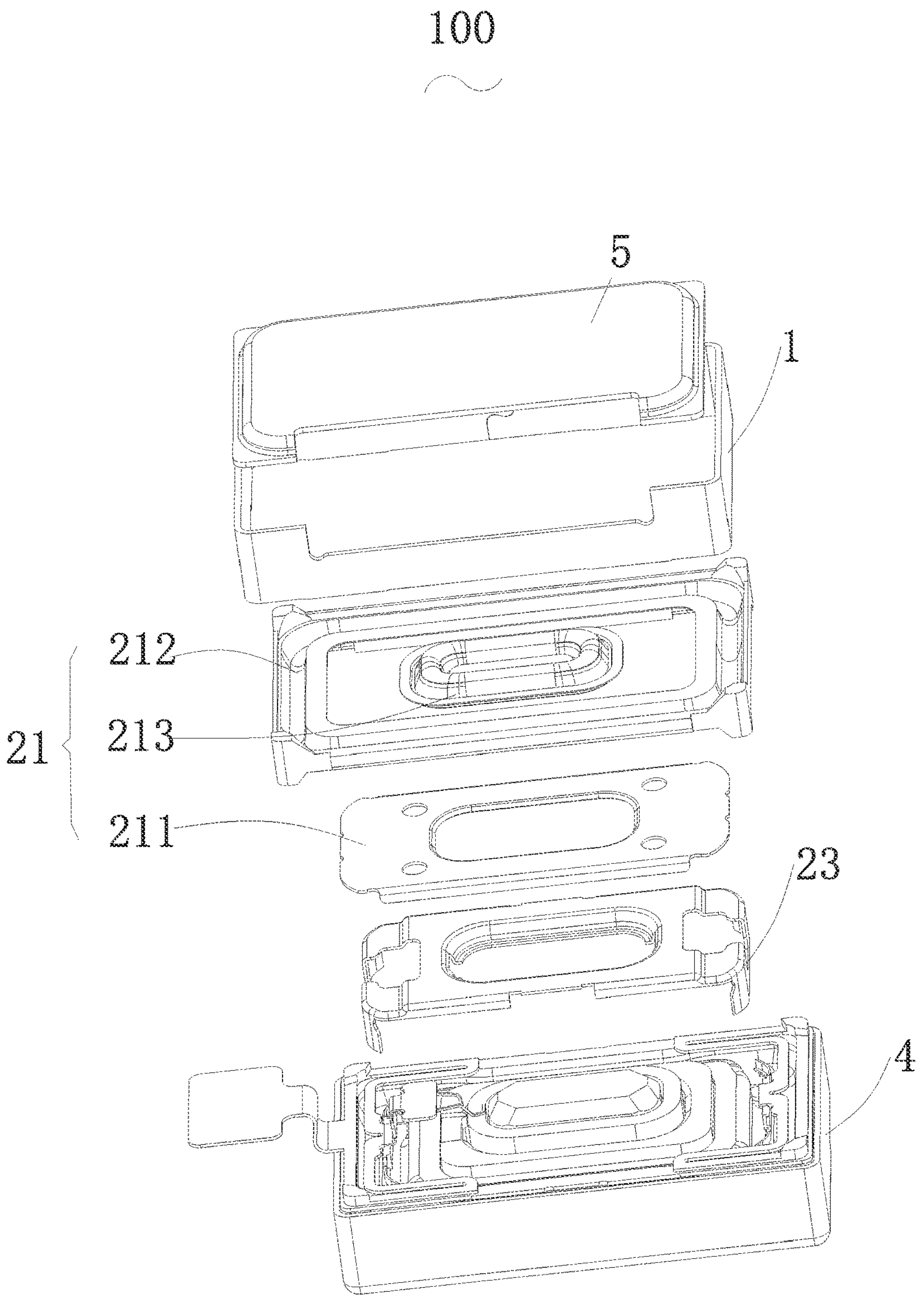
FIG. 6 is a partial exploded schematic diagram of the sound device according to one embodiment of the present disclosure.
Figure 7:
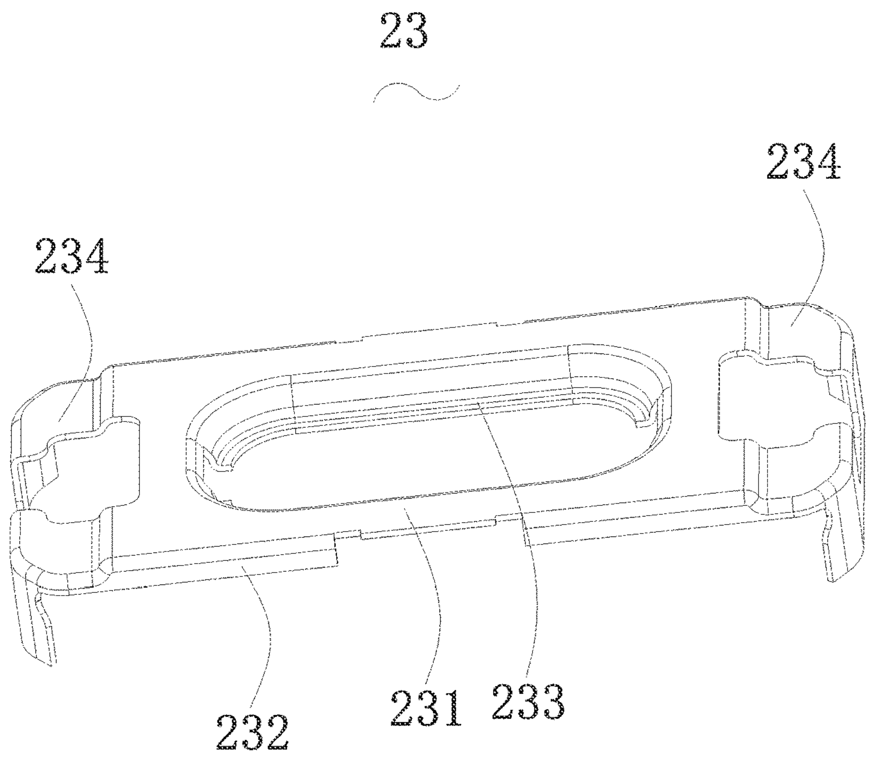
FIG. 7 is a structural schematic diagram of a framework of the sound device according to one embodiment of the present disclosure.

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Referring to FIGS. 1-7, the present disclosure provides a sound device 100, including a frame 1, a vibration system 2, a magnetic circuit system 3, a rear cover 4, and a front cover 5. The magnetic circuit system 3 has magnetic gaps 30. The rear cover 4 is configured to accommodate the magnetic circuit system 3, and the rear cover 4 is fixed on the frame 1. The front cover 5 covers one side, distal from the rear cover 4, of the frame 1. The vibration system 2 and the magnetic circuit system 3 are respectively supported on the frame 1. The magnetic circuit system 3 drives the vibration system 2 to vibrate and produce sound.

In the present embodiment, the vibration system 2 includes a vibrating diaphragm 21, a voice coil 22, and a framework 23. The voice coil 22 is inserted into the magnetic gaps 30 to drive the vibrating diaphragm 21 to vibrate and produce sound. The framework 23 is configured to connect the vibrating diaphragm 21 and the voice coil 22.

The vibrating diaphragm 21 includes a dome portion 211, a first folding ring portion 212, and a second folding ring portion 213. The dome portion 211, the first folding ring portion 212, and the second folding ring portion 213 are all annular. The first folding ring portion 212 surrounds the second folding ring portion 213. The first folding ring portion 212 and the second folding ring portion 213 are mutually spaced. The dome portion 211 is disposed between the first folding ring portion 212 and the second folding ring portion 213. The dome portion 211 is connected to the first folding ring portion 212 and the second folding ring portion 213. The vibrating diaphragm 21 further includes a first fixing portion 214, a second fixing portion 215, and a third fixing portion 216. The first fixing portion 214 is bent and extends from one side, close to the second folding ring portion 213, of the first folding ring portion 212. The second fixing portion 215 is bent and extends from one side, close to the first folding ring portion 212, of the second folding ring portion 213. The third fixing portion 216 is bent and extends from one side, distal from the second folding ring portion 213, of the first folding ring portion 212. The third fixing portion 216 is fixed on an inner peripheral side of the frame 1.

The dome portion 211 further includes a dome body 2111 and a first dome extension wall 2112, where the dome body 2111 is annular. The first dome extension wall 2112 is bent and extend from the dome body 2111 to a direction close to the magnetic circuit system 3. The first dome extension wall 2112 is connected to the first fixing portion 214.

The first folding ring portion 212 and the second folding ring portion 213 are both of an arc-shaped structure. Arc-shaped concave directions of the first folding ring portion 212 and the second folding ring portion 213 are opposite. More specifically, the arc-shaped concave direction of the first folding ring portion 212 is in a direction close to the voice coil 22. The arc-shaped concave direction of the second folding ring portion 213 is in a direction distal from the voice coil 22.

The framework 23 includes a framework flat plate wall 231, a first framework extension wall 232, a second framework extension wall 233, and framework glue containing portions 234. The framework flat plate wall 231 is attached to one side, close to the voice coil 22, of the dome body 2111. The first framework extension wall 232 is formed by bending and extending from one side, close to the first folding ring portion 212, of the framework flat plate wall 231 towards the magnetic circuit system. The first framework extension wall 232 and the first dome extension wall 2112 are oppositely disposed at intervals. The second framework extension wall 233 extends from one side, close to the second folding ring portion 213, of the framework flat plate wall 231 towards the voice coil 22. The second framework extension wall 233 is fixedly connected to the voice coil 22. The framework glue containing portions 234 are formed by bending and extending from the framework flat plate wall 231 to the magnetic circuit system. The framework glue containing portions 234 and the dome portion 211 are disposed at intervals. The framework glue containing portions 234 are in a flat plate shape. The framework glue containing portions 234 are parallel to the dome body 2111. In the embodiment, there are two framework glue containing portions 234. The two framework glue containing portions 234 are symmetrically disposed on two sides of long shafts of the framework flat plate wall 231.

Furthermore, the first dome extension wall 2112 is formed by extending the dome body 2111 in a vibration direction of the vibrating diaphragm 21. The first framework extension wall 232 is formed by extending one side, close to the first folding ring portion 212, of the framework flat plate wall 231 in the vibration direction.

The first framework extension wall 232 and the first fixing portion 214 are disposed at intervals. That is, the first framework extension wall 232 and the first dome extension wall 2112 are disposed at intervals, and there is a gap between the first framework extension wall 232 and the first dome extension wall 2112.

In the present embodiment, the dome portion 211 further includes a second dome extension wall 2113, the second dome extension wall 2113 is bent and extends from one side, distal from the first dome extension wall 2112, of the dome body 2111 to a direction of the magnetic circuit system 3. A certain angle is formed between a bending direction of the second dome extension wall 2113 and the vibration direction. That is, the second dome extension wall 2113 is not bent along the vibration direction. The second dome extension wall 2113 is connected to the second fixing portion 215.

Figure 8:
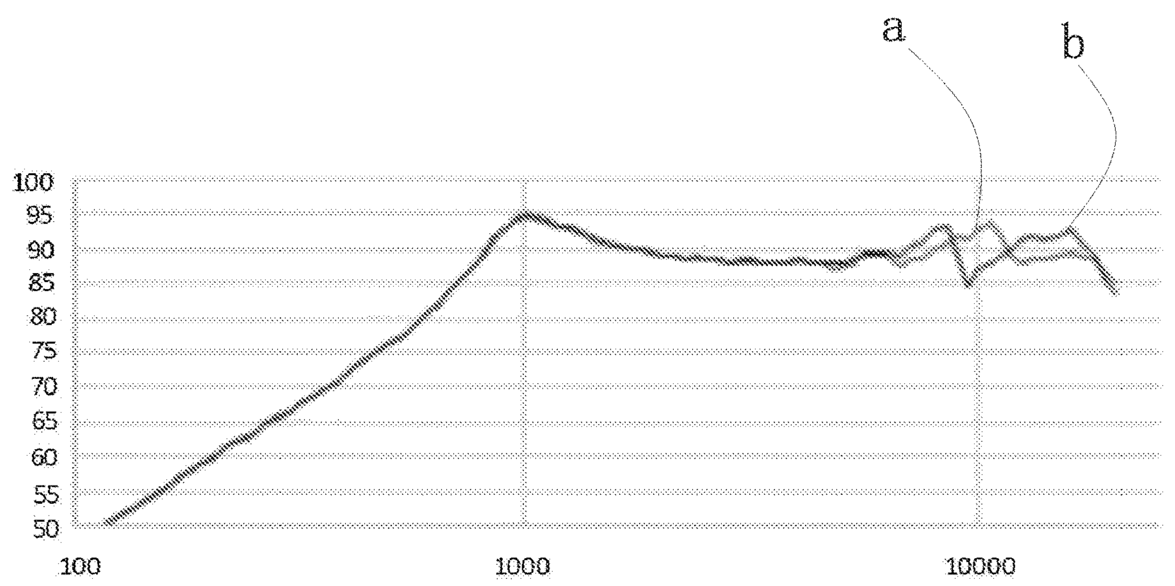
FIG. 8 is frequency response curve graphs of the sound device and another sound device according to one embodiment of the present disclosure.

As shown in FIG. 8, FIG. 8 is frequency response curve graphs of the sound device 100 and another sound device according to one embodiment of the present disclosure. The sound device of the present disclosure and other sound devices are mainly different in structure. The curve "a" represents a frequency response curve of the sound device 100 of the present disclosure. The curve "b" represents a frequency response curve of another sound device. More specifically, the curve "a" is a frequency response curve of the framework having the framework glue containing portions 234. The curve "b" is a frequency response curve of the framework on which no framework glue containing portions 234 are disposed. It should be seen that the sound device 100 of the present disclosure has better high-frequency performance.

Compared with related art, the sound device of the present disclosure includes the frame, the vibration system, and the magnetic circuit system. The vibration system is supported on the frame. The magnetic circuit system has the magnetic gaps. The vibration system includes the vibrating diaphragm, the voice coil, and the framework. The voice coil is inserted into the magnetic gaps to drive the vibrating diaphragm to vibrate and produce sound. The framework is configured to connect the vibrating diaphragm and the voice coil. The vibrating diaphragm includes the dome portion, the first folding ring portion, and the second folding ring portion. The dome portion, the first folding ring portion, and the second folding ring portion are all annular. The first folding ring portion surrounds the second folding ring portion. The first folding ring portion and the second folding ring portion are mutually spaced. The dome portion is disposed between the first folding ring portion and the second folding ring portion. The dome portion is connected to the first folding ring portion and the second folding ring portion. The framework includes the framework flat plate wall and framework glue containing portions. The framework glue containing portions are bent from the framework flat plate wall to the magnetic circuit system. The framework flat plate wall is connected to the dome portion. The framework glue containing portions and the dome portion are disposed at intervals. Therefore, by bending the framework from the framework flat plate wall to the magnetic circuit system, where the framework includes the framework glue containing portions, it is conducive to enhancing strength of the vibration system, which improves impact of division vibration on performance, expands high frequency of the sound device, and improves the high-frequency performance of the sound device to a certain extent.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A sound device, comprising:

a frame;

a vibration system; and a magnetic circuit system;

wherein the vibration system is supported on the frame, the magnetic circuit system has magnetic gaps; the vibration system comprises a vibrating diaphragm, a voice coil, and a framework; the voice coil is inserted into the magnetic gaps to drive the vibrating diaphragm to vibrate and produce sound, the framework is configured to connect the vibrating diaphragm and the voice coil; the vibrating diaphragm comprises a dome portion, a first folding ring portion, and a second folding ring portion; the dome portion, the first folding ring portion, and the second folding ring portion are all annular; the first folding ring portion surrounds the second folding ring portion, the first folding ring portion and the second folding ring portion are mutually spaced; the dome portion is disposed between the first folding ring portion and the second folding ring portion, the dome portion is connected to the first folding ring portion and the second folding ring portion;

the framework comprises a framework flat plate wall and framework glue containing portions, the framework glue containing portions are bent from the framework flat plate wall to the magnetic circuit system; the framework flat plate wall is connected to the dome portion, and the framework glue containing portions and the dome portion are disposed at intervals;

the vibrating diaphragm further comprises a first fixing portion and a second fixing portion; the first fixing portion is bent and extends from one side, close to the second folding ring portion, of the first folding ring portion; the second fixing portion is bent and extends from one side, close to the first folding ring portion, of the second folding ring portion;

the dome portion further comprises a first dome extension wall and a second dome extension wall, the first dome extension wall and the second dome extension wall are bent and extend from the dome body to a direction close to the magnetic circuit system, the first dome extension wall is connected to the first fixing portion, and the second dome extension wall is connected to the second fixing portion.

2. The sound device according to claim 1, wherein the dome portion comprises a dome body, where the dome body is annular, the framework glue containing portions are in a flat plate shape, and the framework glue containing portions are parallel to the dome body.

3. The sound device according to claim 2, wherein the framework comprises two framework glue containing portions, the two framework glue containing portions are symmetrically disposed on two sides of long shafts of the framework flat plate wall.

4. The sound device according to claim 1, wherein the framework further comprises a first framework extension wall and a second framework extension wall, the framework flat plate wall is attached to one side, close to the voice coil, of the dome body; the first framework extension wall is formed by bending and extending from one side, close to the first folding ring portion, of the framework flat plate wall towards the magnetic circuit system; the first framework extension wall and the first dome extension wall are oppositely disposed at intervals; the second framework extension wall extends from one side, close to the second folding ring portion, of the framework flat plate wall towards the voice coil; and the second framework extension wall is fixedly connected to the voice coil.

5. The sound device according to claim 4, wherein the first framework extension wall and the first fixing portion are disposed at intervals.

6. The sound device according to claim 4, wherein the first dome extension wall is formed by extending the dome body in a vibration direction of the vibrating diaphragm; and the first framework extension wall is formed by extending one side, close to the first folding ring portion, of the framework flat plate wall in the vibration direction.

7. The sound device according to claim 1, wherein the first folding ring portion and the second folding ring portion are both of an arc-shaped structure, and arc-shaped concave directions of the first folding ring portion and the second folding ring portion are opposite.

8. The sound device according to claim 7, wherein the arc-shaped concave direction of the first folding ring portion is in a direction close to the voice coil, and the arc-shaped concave direction of the second folding ring portion is in a direction distal from the voice coil.

9. The sound device according to claim 1, wherein the vibrating diaphragm further comprises a third fixing portion; the third fixing portion is bent and extends from one side, distal from the second folding ring portion, of the first folding ring portion; and the third fixing portion is fixed on an inner peripheral side of the frame.

* * * * *